(12) United States Patent
Wheelwright et al.

(10) Patent No.: US 10,677,206 B2
(45) Date of Patent: Jun. 9, 2020

(54) REMOVING WATER FROM FUEL TANKS (71) Applicant: AIRBUS OPERATIONS LIMITED, Bristol (GB)

(72) Inventors: Jay Wheelwright, Bristol (GB); Jacob Dobbs, Bristol (GB); Christian Martin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 33 days.

(21) Appl. No.: 15/653,936

(22) Filed: Jul. 19, 2017

(65) Prior Publication Data

US 2018/0023526 A1  Jan. 25, 2018

(30) Foreign Application Priority Data

Jul. 20, 2016 (GB) .................................. 1612584.1

(51) Int. Cl.
  *B01D 36/00* (2006.01)
  *B60K 15/03* (2006.01)
  (Continued)

(52) U.S. Cl.
  CPC ........... *F02M 37/24* (2019.01); *B01D 36/003* (2013.01); *B01D 61/364* (2013.01); *B01D 69/10* (2013.01);
  (Continued)

(58) Field of Classification Search
  CPC .............. B01D 2257/80; B01D 36/003; B01D 61/364; B01D 69/10; B01D 71/024;
  (Continued)

(56) References Cited

U.S. PATENT DOCUMENTS 3,322,280 A    5/1967  Taylor
4,880,029 A *  11/1989 Koller .................. F16K 31/528
                                              137/329.06
(Continued)

FOREIGN PATENT DOCUMENTS

WO       2006/072545       7/2006
WO    WO 2014/174247      10/2014

OTHER PUBLICATIONS

R.R. Nair, et al., "Unimpeded Permeation of Water Through the Helium-Leak-Tight Graphene-Based Membranes", Science, Jan. 27, 2012, vol. 335, No. 6067, pp. 442-444.

*Primary Examiner* — Pranav N Patel
(74) *Attorney, Agent, or Firm* — Nixon & Vanderhye P.C.

(57) ABSTRACT

A combination of a fuel tank assembly and a tool for opening an outlet of the fuel tank assembly. The assembly includes a tank for storing a liquid hydrocarbon; and an operator-openable valve arrangement configured to move between a closed flow condition in which flow through the valve arrangement is prevented and an open flow condition in which liquid is allowed to drain out of the tank. The tool is connectable to the valve arrangement, such that in a connected condition of the tool and the arrangement a liquid flow path exists between the interior and the exterior of the tank. The liquid flow path is at least partly defined by a conduit in the tool. A filter, in the flow path, includes a water-permeable member configured to enable water to pass through the water-permeable member and substantially prevent passage of liquid hydrocarbon.

32 Claims, 8 Drawing Sheets (51) Int. Cl.
  *C10G 33/06* (2006.01)
  *F02M 37/22* (2019.01)
  *F02M 37/24* (2019.01)
  *B64D 37/28* (2006.01)
  *B01D 61/36* (2006.01)
  *B01D 69/10* (2006.01)
  *B01D 71/02* (2006.01)
  *B64D 37/02* (2006.01)

(52) U.S. Cl.
  CPC ...... *B01D 71/024* (2013.01); *B60K 15/03006* (2013.01); *B64D 37/28* (2013.01); *C10G 33/06* (2013.01); *B01D 2257/80* (2013.01); *B60K 2015/03236* (2013.01); *B60K 2015/03276* (2013.01); *B64D 37/02* (2013.01)

(58) Field of Classification Search
  CPC .... B60K 15/03006; B60K 2015/03236; B60K 2015/03276; B64D 37/02; B64D 37/28; C10G 33/06; F02M 37/221
  See application file for complete search history.

(56) References Cited

U.S. PATENT DOCUMENTS

| | | | |
|---|---|---|---|
| 5,606,989 A | 3/1997 | Roll et al. | |
| 2008/0128350 A1* | 6/2008 | Arakawa | B01D 61/02 210/500.21 |
| 2008/0164205 A1* | 7/2008 | Montelauro | B01D 29/15 210/600 |
| 2011/0155656 A1* | 6/2011 | Brielmann | F02M 37/24 210/232 |
| 2013/0025269 A1* | 1/2013 | Hodgson | F01N 3/2066 60/317 |
| 2015/0231577 A1* | 8/2015 | Nair | B01D 71/024 210/640 |
| 2015/0354710 A1* | 12/2015 | Richardson | F16K 1/526 210/419 |

* cited by examiner

REMOVING WATER FROM FUEL TANKS

RELATED APPLICATION

This application claims priority to and entirely incorporates by reference United Kingdom Patent Application GB 1612584.1, filed 20 Jul. 2016.

FILED OF THE INVENTION

The present invention relates to a combination of a fuel tank assembly and a tool for opening an outlet of the fuel tank assembly. The present invention also relates to a fuel tank assembly comprising a tank for storing a liquid hydrocarbon, typically but not exclusively an aircraft fuel tank assembly, and to a tool for opening an outlet of a fuel tank having an operator-openable valve arrangement.

BACKGROUND OF THE INVENTION

Problems may be caused by water contamination in aircraft fuel systems. In particular, water contamination in fuel is known to collate in aircraft fuel tanks. When an aircraft reaches altitude during operation, the ambient temperature drops to around −50° C. which can lead to ice formation within the fuel.

The formation of ice during operation of an aircraft at altitude can lead to the reduced or ceased functionality of fuel system components (e.g. through clogging, or other processes), such as filters, fuel pumps and gauges. The presence of water in a fuel tank can also lead to the growth of microbiological contamination (MBC), which may also cause similar problems. As such it is desirable to remove water from a fuel tank before such problems occur.

A known method of removing water from a fuel system is to locate a drain valve at the sump floor of a fuel tank, or to fluidly communicate a drain valve with the sump of a fuel tank. However, such drain valves are unable to discriminate between water and fuel such that either insufficient water is drained from the fuel tank, or fuel is removed from the fuel tank together with the water. Moreover, it is necessary for an operator to manually operate a drain valve into an open flow condition, and for the drained waste fuel/water mix to be disposed of in an appropriate manner.

An alternative method for removing water from a fuel system has been proposed. WO2014/174247 describes a fuel tank for storing liquid hydrocarbon. The fuel tank has a filter fitted to the floor of the fuel tank. The filter has a permeation member such as a membrane, which is formed from a material such as graphene oxide. This membrane allows liquid water in the tank to drain out of the tank through the filter but substantially prevents the liquid hydrocarbon in the tank from doing so.

"Unimpeded Permeation of Water Through the Helium-Leak-Tight Graphene-Based Membranes", R. R. Nair et al, Science, 27 Jan. 2012, Vol. 335, no. 6067, pp. 442-444, DOI:10.1126/science.1211694 demonstrated that sub micro meter-thick membranes made from graphene oxide can be completely impermeable to liquid, vapours, and gasses, including helium, but that the membranes allow unimpeded permeation of water.

However, a problem with a fuel tank having such a filter it is not possible to control the flow of water through the filter and out of the aircraft.

SUMMARY OF THE INVENTION

According to a first embodiment of the invention, there is provided a combination of a fuel tank assembly and a tool for opening an outlet of the fuel tank assembly. The fuel tank assembly comprises a tank for storing a liquid hydrocarbon; and an operator-openable valve arrangement configured to move between a closed flow condition in which flow through the valve arrangement is prevented and an open flow condition in which liquid is allowed to drain out of the tank. The tool is connectable to the valve arrangement, such that in a connected condition of the tool and the valve arrangement the valve arrangement is in the open flow condition and a liquid flow path exists between the interior of the tank and the exterior of the tank. The liquid flow path is at least partly defined by a conduit comprised in the tool. A filter is disposed in the flow path. The filter comprises a water-permeable member which is configured to enable liquid water to pass through the water-permeable member, but at least substantially prevent liquid hydrocarbon from doing so.

The valve arrangement may be biased towards the closed flow condition. The valve arrangement may be a normally closed sprung valve.

The valve arrangement may be configured to receive the tool and interact with the tool to move into the open flow condition. The valve arrangement may be configured to be lockable in the open flow condition. The valve arrangement may be configured to receive the tool and interact with the tool to lock the valve arrangement in the open flow condition. The outflow may be configured to receive the tool to lock the valve arrangement in the open flow condition.

The outflow may be configured to allow insertion of the tool when the tool is in a first orientation, and to engage with the tool to restrict removal of the tool and lock the valve arrangement in the open flow condition when the tool is moved into a second orientation. The tool may comprise a valve engaging head configured to conform with the outflow to allow insertion of the tool into the outflow when the tool is in the first orientation and to engage the valve arrangement to restrict removal of the tool and lock the valve arrangement in the open flow condition when the tool is in the second orientation.

The valve engaging head may be non-circular. The tool may further comprise a tool shaft extending from the valve engaging head. The conduit in the tool may extend from an outer face of the valve engaging head and into the tool shaft.

The water-permeable member may comprise graphene oxide. The water-permeable member may comprise a graphene oxide membrane. The water permeable member may comprise a graphene enhanced filter. Such a graphene enhanced filter may comprise one or more of: a functionalised graphene oxide doped permeable membrane; functionalised graphene oxide nanotubes; functionalised graphene oxide hollow fibres. The filter may comprise a support structure to support the water-permeable member. The water-permeable member may comprise a water-permeable material. The support structure may comprise a support layer to support the water-permeable material. The support layer may be a porous substrate.

The valve arrangement may be a poppet valve.

The filter may be comprised in the fuel tank assembly.

The filter may be comprised in the tool.

According to a second embodiment of the invention, there is provided a fuel tank assembly for a combination according to the first embodiment. The fuel tank assembly comprises a tank for storing a liquid hydrocarbon, a filter, and an operator-openable valve arrangement. The filter comprises a water-permeable member which is configured to enable liquid water in the tank to pass through the water-permeable member, but at least substantially prevent liquid hydrocarbon from doing so. The operator-openable valve arrangement is configured to move between a closed flow condition in which flow through the valve arrangement is prevented, and an open flow condition in which liquid water which passes through the water-permeable member is allowed to drain out of the tank through an outflow.

The filter comprising the water-permeable membrane may be configured to enable liquid water in the tank to pass through the water-permeable membrane to the valve arrangement, but at least substantially prevent liquid hydrocarbon from doing so.

The valve arrangement may be between the filter and the outflow.

The filter may act as a barrier between liquid hydrocarbon in the tank and the valve arrangement.

The filter may enclose the valve arrangement in the tank.

A liquid water receiving space may be defined between the filter and the valve arrangement.

The valve arrangement may comprise an enclosure having an opening, wherein the filter may be on the enclosure to cover the opening.

The valve arrangement and filter may together form a cartridge.

The cartridge may be removably mounted to the tank.

The fuel tank assembly may further comprise a housing in the tank, wherein the cartridge may be configured to be at least partially received by and mounted to the housing.

One or both of the filter and valve arrangement may be integral with the fuel tank.

According to a third embodiment of the invention, there is provided a cartridge for a fuel tank assembly according to the second embodiment. The cartridge comprises a filter and an operator-openable valve arrangement. The filter comprises a water-permeable member which is configured to enable liquid water to pass through the water-permeable member, but at least substantially prevent liquid hydrocarbon from doing so. The operator-openable valve arrangement is configured to move between a closed flow condition in which flow through the valve arrangement is prevented and an open flow condition in which liquid water which passes through the water-permeable member is allowed to drain through an outflow.

According to a fourth embodiment of the invention, there is provided a tool for opening an outlet of a fuel tank having an operator-openable valve arrangement moveable between a closed flow condition in which flow through the valve arrangement is prevented and an open flow condition in which liquid is allowed to drain out of the tank. The tool comprises a valve engaging head, a conduit, and a filter. The valve engaging head is configured to engage with the valve arrangement to move the valve arrangement between the open and closed flow conditions, and has an inlet for receiving a flow of liquid flowing out of the valve arrangement. The conduit defines a liquid flow path through the tool between the inlet and an outlet. The filter is disposed in the liquid flow path, and comprises a water-permeable member which is configured to enable liquid water to pass through the water-permeable member, but at least substantially prevent liquid hydrocarbon from doing so.

The filter may be disposed in the head. The filter may be comprised in a removable cartridge. Alternatively, the filter may be integral with the tool.

The tool may further comprise at least one sealing member. The sealing member may be configured to contact an outer surface of the fuel tank when the tool is engaged with the valve arrangement, to create an enclosed space bounded by an outer surface of the fuel tank, a surface of the tool, and the sealing member. The at least one sealing member may be moveable relative to the valve-engaging head, to enable the sealing member to maintain contact with the outer surface of the fuel tank during a process of moving the valve arrangement between the closed flow condition and the open flow condition using the tool. The at least one sealing member may comprise a primary sealing member and a secondary sealing member. The primary sealing member may be configured to create a relatively small enclosed space, and the secondary member may be configured to create a relatively large enclosed space. The primary sealing member may be contained within the enclosed space created by the secondary sealing member.

The tool may be the tool of the combination according to the first embodiment.

A fifth embodiment of the invention provides a cartridge for a tool according to the fourth embodiment. The cartridge comprises a support structure configured to be received and retained in the tool; and a filter mounted on the support structure. The filter comprises a water-permeable member which is configured to enable liquid water to pass through the water-permeable member, but at least substantially prevent liquid hydrocarbon from doing so.

BRIEF DESCRIPTION OF THE DRAWINGS

Embodiments of the invention will now be described with reference to the accompanying drawings, in which:

FIG. 2b is a schematic view of a tool for opening an outlet of the fuel tank assembly of FIG. 2a;

FIG. 12b is a side view of the example drain tool and valve of FIG. 12a;

FIG. 12c is a cross section through the example drain tool and valve of FIG. 12a;

FIG. 13a is a partial cutaway view of the example drain tool of FIG. 12a during a process of engaging with the example valve of FIG. 12a;

FIG. 13b is a side view of a head part of the example drain tool of FIG. 12a, connected to the example valve of FIG. 12a;

FIG. 13c is a cross-section through the head part and valve of FIG. 13a; and

FIG. 13d is a bottom view of the example water drain valve of FIG. 12a.

DETAILED DESCRIPTION OF EMBODIMENT(S)

Figure 1:
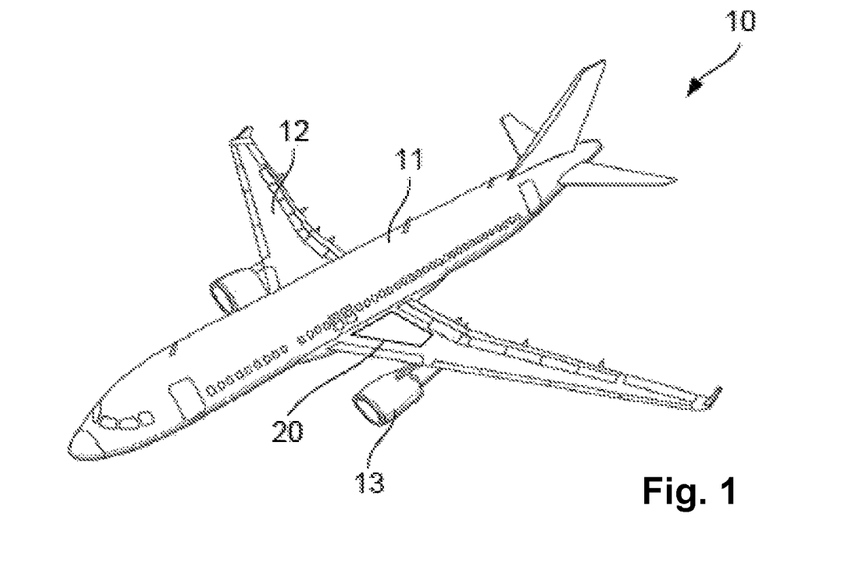
FIG. 1 illustrates an aircraft having a fuel tank assembly with a fuel tank.

FIG. 1 shows an aircraft 10. The aircraft 10 has a fuselage 11 carrying a pair of wings 12. Each wing 12 has an engine 13. The aircraft 10 has a fuel tank assembly 20. The fuel tank assembly 20 is configured to supply fuel to the engines 13.

Figure 2A:
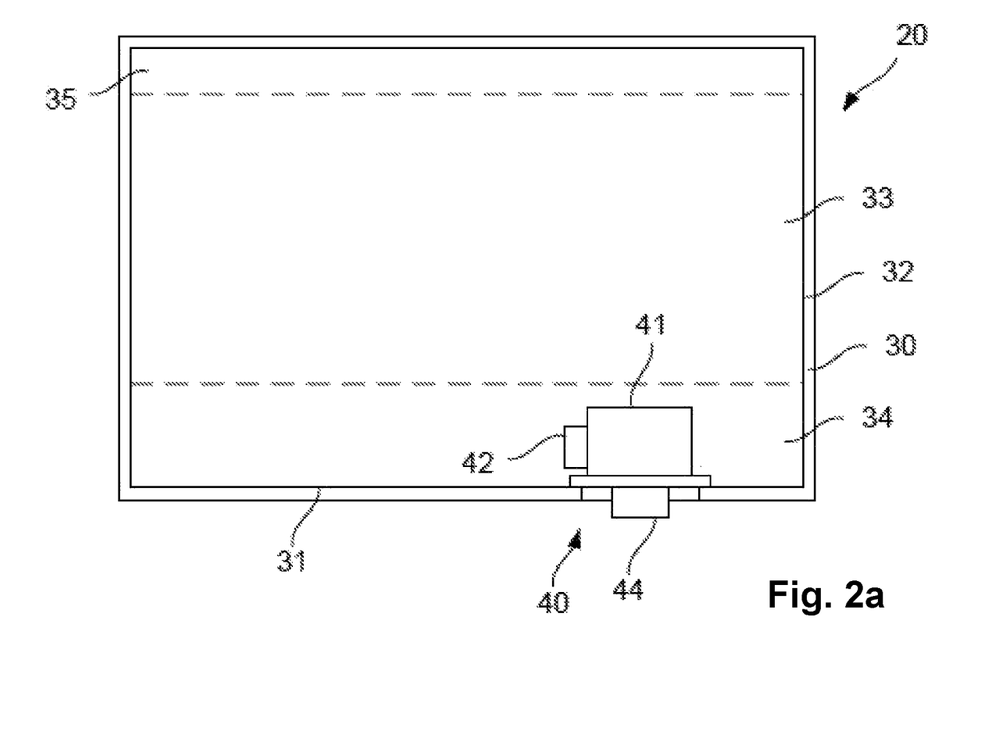
FIG. 2a is a schematic partial cross-sectional view of the fuel tank assembly for an aircraft of FIG. 1.

Fuel for each engine 13 is stored in one or more aircraft fuel tanks 30 of the tank assembly 20. A schematic view of the fuel tank 30 is shown in FIG. 2a. Fuel is stored in a centre tank within the fuselage 13 and one or more wing tanks within the wings 12. The description below refers to the aircraft fuel tank 30, which could equally refer to the centre tank, any of the wing tanks, an externally mounted tank, or an alternative fuel tank arrangement.

The fuel tank 30 forms part of the fuel tank assembly 20. Aircraft fuel includes liquid hydrocarbon fuel, such as kerosene. The fuel tank 30 is enclosed and comprises a floor 31 and side walls 32. The floor 31 in a wing tank is typically formed by a lower cover, and the side walls 32 by front and rear spars, and ribs. The floor 31 supports the weight of the contents of the fuel tank 30.

In FIG. 2a, the contents of the fuel tank 30 are shown schematically with fuel 33, water 34 and air 35 shown in stratified layers. The fuel tank 30 is filled with jet fuel, which is typically a liquid hydrocarbon, such as kerosene, but may be any type of fuel suitable for powering an aircraft. As water is more dense than the fuel, for example, it will tend to sink to the bottom of the fuel tank 30. The liquid head generates a pressure at the lower end of the fuel tank 30.

The tank assembly 20 has a water drain valve (also referred to as a sump drain valve) 40 at the floor 31 of the fuel tank 30. In the present embodiment, the water drain valve 40 is mounted through the floor 31 of the fuel tank 30, however it will be understood that the water drain valve 40 may be spaced from the floor of 31 by a conduit (not shown) which fluidly communicates the water drain valve 40 with the floor 31 of the fuel tank 30.

The water drain valve 40 has a housing 41. The housing 41 defines an inflow 42 and an outflow 44. The inflow 42 of the water drain valve 40 enables the contents of the fuel tank 30 to flow into the water drain valve 40. The outflow 44 is a feature through which water flows out from the water drain valve 40. The water drain valve 40 is disposed at a low point of the floor 31 of the fuel tank 30. Although only one water drain valve 40 is shown in FIG. 2a, two or more water drain valves 40 may be utilised if required.

Figure 2B:
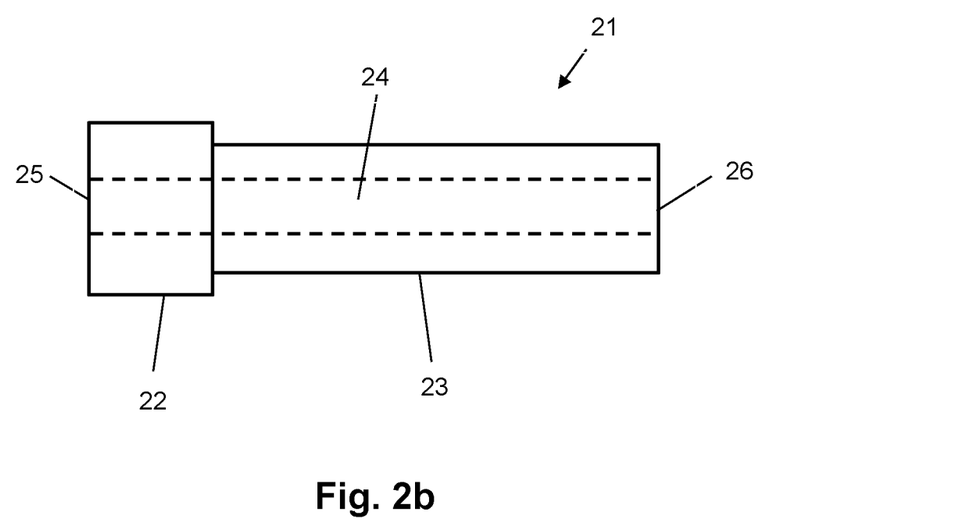

The water drain valve 40 is configured to move between a closed flow condition in which flow through the valve is prevented and an open flow condition in which liquid is allowed to train out of the tank (through the valve). The drain valve 40 is openable by an operator using a drain tool. An example drain tool 21 is shown in FIG. 2b. The drain tool 21 is connectable to the drain valve 40 such that in a connected condition of the tool 21 and the valve 40 the valve 40 is in the open condition and a liquid flow path exists between the interior of the tank and the exterior of the tank. The drain tool 21 is configured to act on the valve 40 to move the valve 40 between its closed flow condition and its open flow condition.

The drain tool 21 comprises a tool head 22 and a tool shaft 23. The profile of the tool head 22 corresponds to the profile of the outflow 44. In particular, the profile shape and size of the tool head 22 is such that it is able to be received within an aperture defining the inner side of the outflow 44. The configuration of the tool head 22 may differ from that of the outflow 44. In some examples the tool head 22 is arranged to act as a key to lock the valve 40 in its open flow condition. The tool shaft 23 acts as a handle for the drain tool 21. The tool shaft 23 is elongate and extends from the tool head 22. The tool head 21 comprises at least one inlet 25, which communicates with a conduit (that is, a drain passage) 24 formed in the drain tool 22. The conduit 24 extends, inside the tool, from the head 22 to an end of the shaft 23 distal from the head 22 and communicates the inlet 25 with an outlet 26 at the distal end of the shaft 23. The conduit 24 provides a flow path for fluid received in the inlets 83 to the outlet 84. As such, fluid is able to flow through the drain tool 80 and out a distal end of the drain tool 80 from that received in the valve arrangement 60. The liquid flow path that exists when the drain tool 21 is connected to the valve 40 is at least partly defined by the conduit 24. The drain tool 21 may comprise any suitable known design of tool for draining an aircraft fuel tank.

When the drain tool 22 is connected to the valve 40 such that a liquid flow path exists between the interior of the tank 30 and the exterior of the tank 30, a filter is disposed in the flow path. The filter comprises a water-permeable member which is configured to enable liquid water to pass through the water-permeable member, but at least substantially prevent liquid hydrocarbon from doing so. As will be explained in more detail below, this advantageously facilitates automatic and/or unattended draining of water from the fuel tank 30. In some examples (such as the examples illustrated by FIGS. 3-10) the filter is comprised in the fuel tank assembly 20. In other examples (such as the examples illustrated by FIGS. 11-12) the filter is comprised in the drain tool 21.

Figure 3:
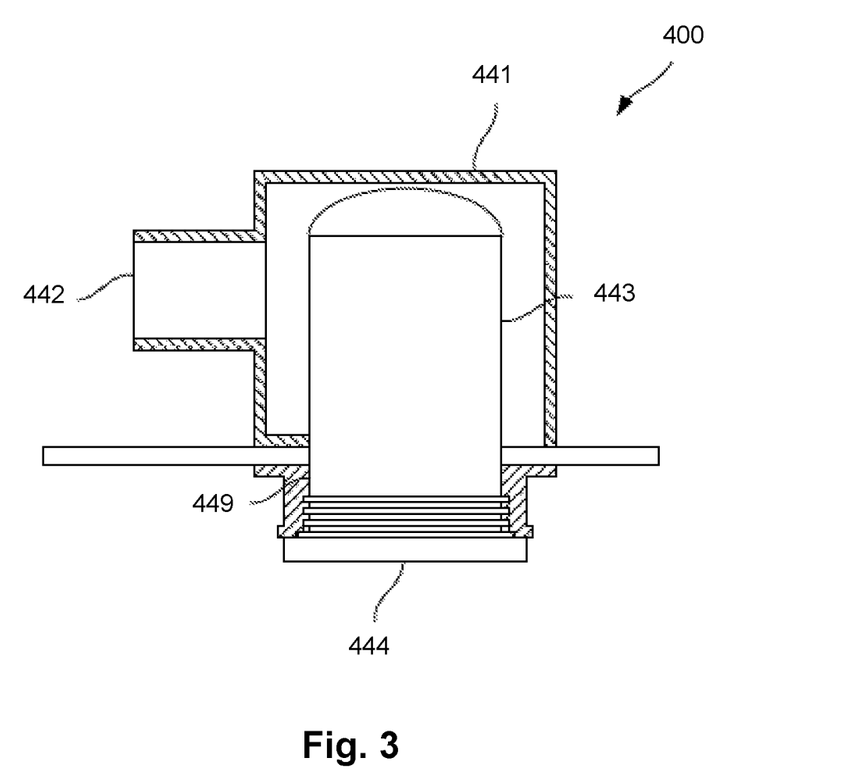
FIG. 3 is a schematic view of an example water drain valve for the fuel tank assembly shown in FIG. 2a with a housing of the water drain valve shown in cross-section.
Figure 4:
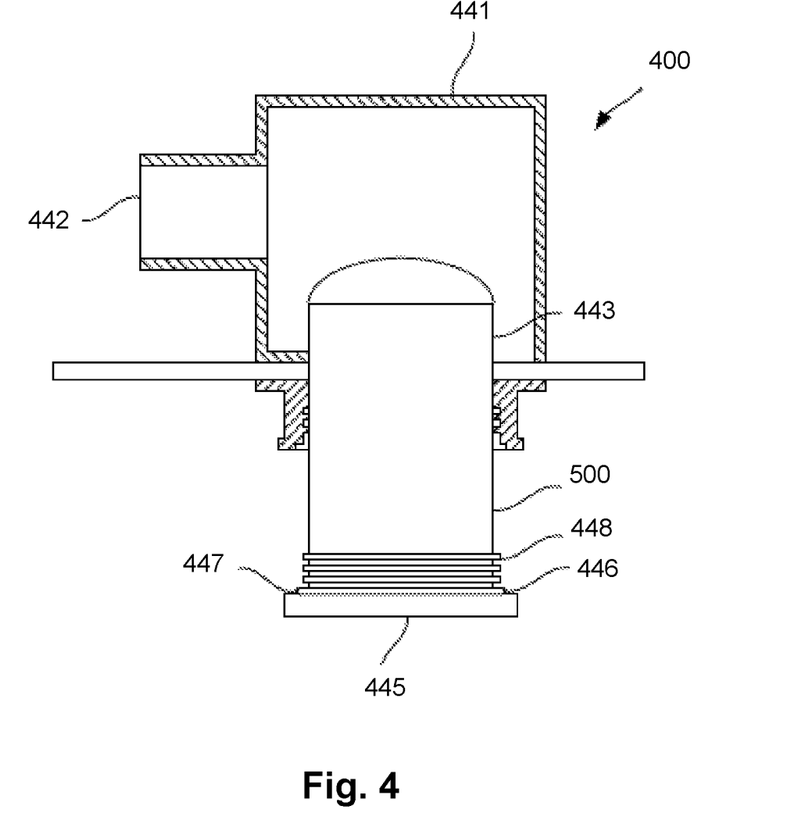
FIG. 4 is a schematic view of the water drain valve shown in FIG. 3 with the water drain valve shown partially disassembled.

FIGS. 3 and 4 show a particular example water drain valve 400, suitable for use as the water/sump drain valve 40, with the rest of the tank assembly 20 omitted. In FIG. 3 and FIG. 4, the housing 41 is shown partially cut away. The water drain valve 400 is arranged to enable the passage of liquid water whilst blocking the passage of liquid hydrocarbon, as will be explained below.

The water drain valve 400 comprises a housing 441 and a drain cartridge 443. The drain cartridge 443 is removably mounted in the housing 441. In the present embodiment, the housing 441 is fixedly mounted to the fuel tank 30. The drain cartridge 443 is removably mounted. In an alternative embodiment the housing 441 and drain cartridge 443 are integrally formed. In another embodiment the housing 441 is omitted. In such an embodiment, the drain cartridge 443 may be fixedly or removably mounted in the fuel tank 30.

The drain cartridge 443 is received in the housing 441. The inflow 442 fluidly communicates the contents of the fuel tank 30 with the drain cartridge 443. In embodiments in which the housing 441 is omitted, the drain cartridge 443 itself defines the inflow 442. The drain cartridge 443 defines an outflow 444. The outflow 444 is a feature through which water flows from the drain cartridge 443. The outflow 444 is exposed from the housing 441 and allows a fluid path for water to flow from the drain cartridge, and therefore from the fuel tank 30, as will be described in detail hereinafter.

In FIG. 4, the drain cartridge 443 is shown partially removed from the housing 441. The drain cartridge 443 comprises a base 445. The base 445 has a sealing arrangement 446 to seal the drain cartridge 443 with the housing 441. In the present embodiment the sealing arrangement 446 is an O-ring 447 which locates against a rim of the housing 441. However, it will be understood that alternative sealing arrangements are envisaged. The base 445 also comprises a mounting arrangement 448 for the drain cartridge 443. The mounting arrangement 448 comprises a screw thread which threadingly engages with the housing 441, although alternative arrangements are possible, such as a bayonet fitting.

Figure 5:
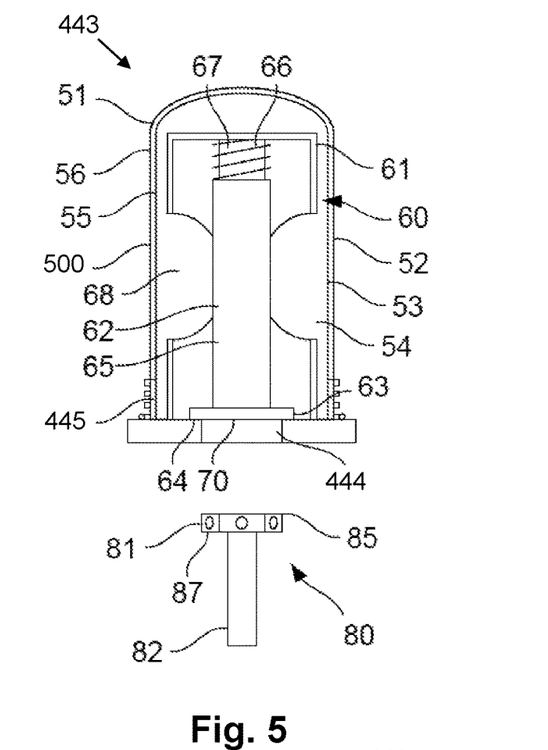
FIG. 5 is a schematic view of part of the water drain valve shown in FIG. 3 in a closed flow condition with some features shown cut away, together with a drain tool.

The drain cartridge 443 has a filter 500. The filter 500 is on the base 445. The filter 500 forms an upper side of the base 445. A partial cut away view of the drain cartridge 443 is shown in FIG. 5. FIG. 5 also shows a particular example drain tool 80 which is used to move the water drain valve 400 into an open flow condition as will be explained below.

Figure 6:
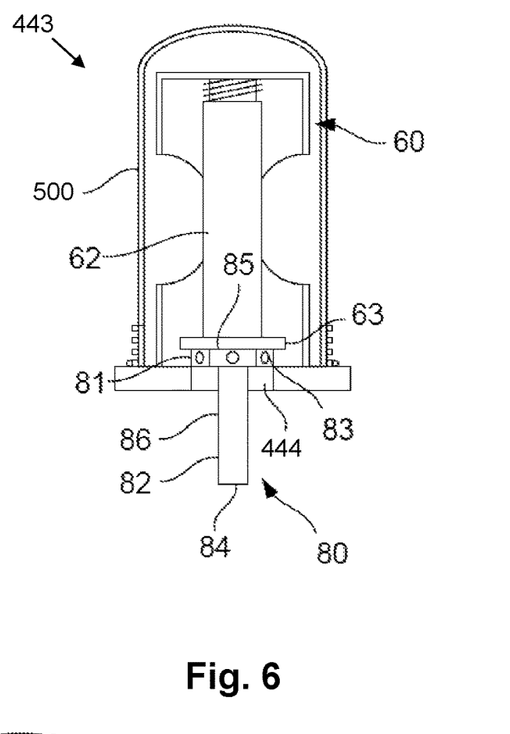
FIG. 6 is a schematic view of the part of the water drain valve shown in FIG. 5 with the drain tool interacting with a valve arrangement of the water drain valve to move the water drain valve into an open flow condition.
Figure 7:
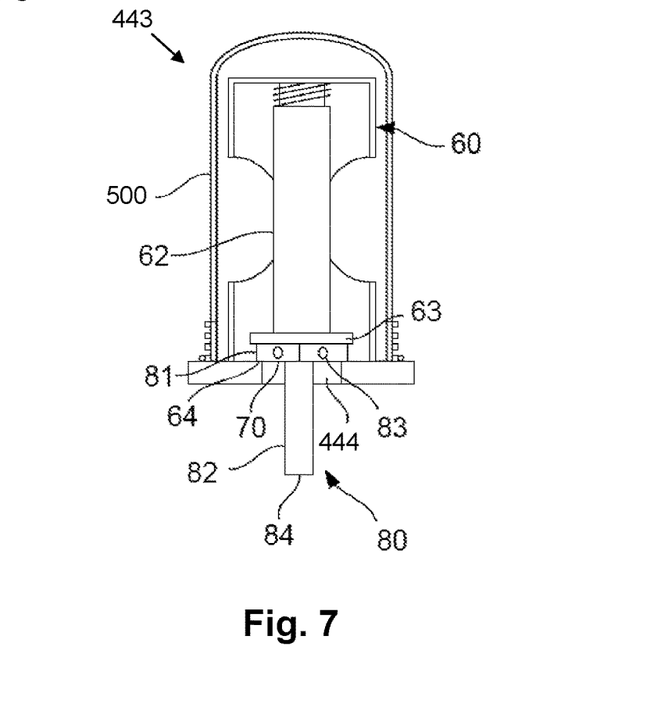
FIG. 7 is a schematic view of the part of the water drain valve shown in FIG. 5 with the drain tool engaged with the valve arrangement to lock the valve arrangement in an open flow condition.

As shown in FIG. 5, the drain cartridge 443 comprises the base 445, the filter 500, and a valve arrangement 60. The filter 500 and valve arrangement 60 work in conjunction to control the flow of fluid through the outflow 443 of the water drain valve 400. In FIGS. 5 to 7 the filter 500 is shown cut away.

The valve arrangement 60 upstands from the base 445. An outflow 444 extends through the base 445. The outflow 444 defines a fluid passage between an internal side of the drain cartridge 443 and an external side. An external end of the outflow 444 is exposed from the water drain valve 440 so that liquid water is able to drain from the fuel tank assembly 20.

The valve arrangement 60 is disposed over the outflow 444. That is, the valve arrangement 60 controls the flow of fluid through the outflow 444, and so controls draining of fluid through the water drain valve 400. A valve seat 64 is defined around the outflow 444. A valve mechanism 62 seals against the valve seat 64 to close the valve arrangement 60 in a closed flow condition, and moves away from the valve seat 64 to allow flow in an open flow condition.

The valve mechanism 62 comprises a valve head 63 which abuts against the valve seat 64 in the closed flow condition, and moves away from the valve seat in the open flow condition. A valve stem 65 extends from the valve head 63. The valve mechanism 62 also comprises a guide arrangement 67 which is configured to guide movement of the valve head 63 and valve stem 65. The valve mechanism 62 also comprises a biasing arrangement 66 which is configured to bias the valve head 63 against the valve seat 64. That is, the biasing arrangement 66 biases the valve arrangement 60 into its closed flow condition. The valve arrangement 60 is moveable into its open flow condition by applying a force against the biasing arrangement 66 to move the valve head 63 away from the valve seat 64.

The valve arrangement 60 further comprises a valve enclosure 61 which surrounds the valve mechanism 62 and acts as a support for the valve mechanism 62. The valve enclosure 61 is shown cut away in FIGS. 5 to 7. Openings 68 are formed in the valve enclosure 61 to enable fluid flow into and through the valve arrangement 60. The number of openings 68 may vary. The valve arrangement 60 is shown schematically in FIGS. 5 to 7, and so it will be understood that alternative arrangements are envisaged.

The valve head 63 abuts against the valve seat 64 to close the outflow 444. The outflow 444 is defined by an aperture 70. By exerting an urging action against the valve head 63 through the outflow 444 it is possible to move the valve head 63 away from the valve seat 64 against the biasing force applied by the biasing arrangement 66. As such, the valve arrangement 60 is movable between its closed flow condition and its open flow condition. When the urging action applied by the operator is removed from the valve head 63, then the biasing arrangement 66 biases the valve head 63 back into abutment with the valve seat 64 to close the outflow 444 such that the valve arrangement 60 moves from its open flow condition to its closed flow condition.

The filter 500 acts as a barrier between liquid hydrocarbon received in the fuel tank 30 and the valve arrangement 60.

The filter 500 upstands from the base 445. The filter 500 encloses the valve arrangement 60. In the present arrangement, the filter 500 is cup shaped, although other arrangements of the filter 500 are possible. The filter 500 comprises a filter body 51, and defines an exposed outer side 52, and an inner side 53. The filter body 51 defines a filtered space 54 on the inner side 53 of the filter 50. The filtered space 54 is sealed to prevent the ingress of liquid hydrocarbons received on the exposed outer side 52 of the filter 500. The exposed outer side 52 defines an unfiltered space.

The filter 500 defines a barrier. The filter 500 comprises a water-permeable member 55. In the present embodiment, the water-permeable member 55 forms the filter 500. However, it will be understood that the filter 500 may be formed in part by the water-permeable member 55 and in part by another member. For example, part of the filter body 51 may be formed by the water-permeable member 55, and part of the filter body 51 by a support member (not shown). The water-permeable member 55 may be two or more regions of the filter body 51.

Figures 8, 9, 10:
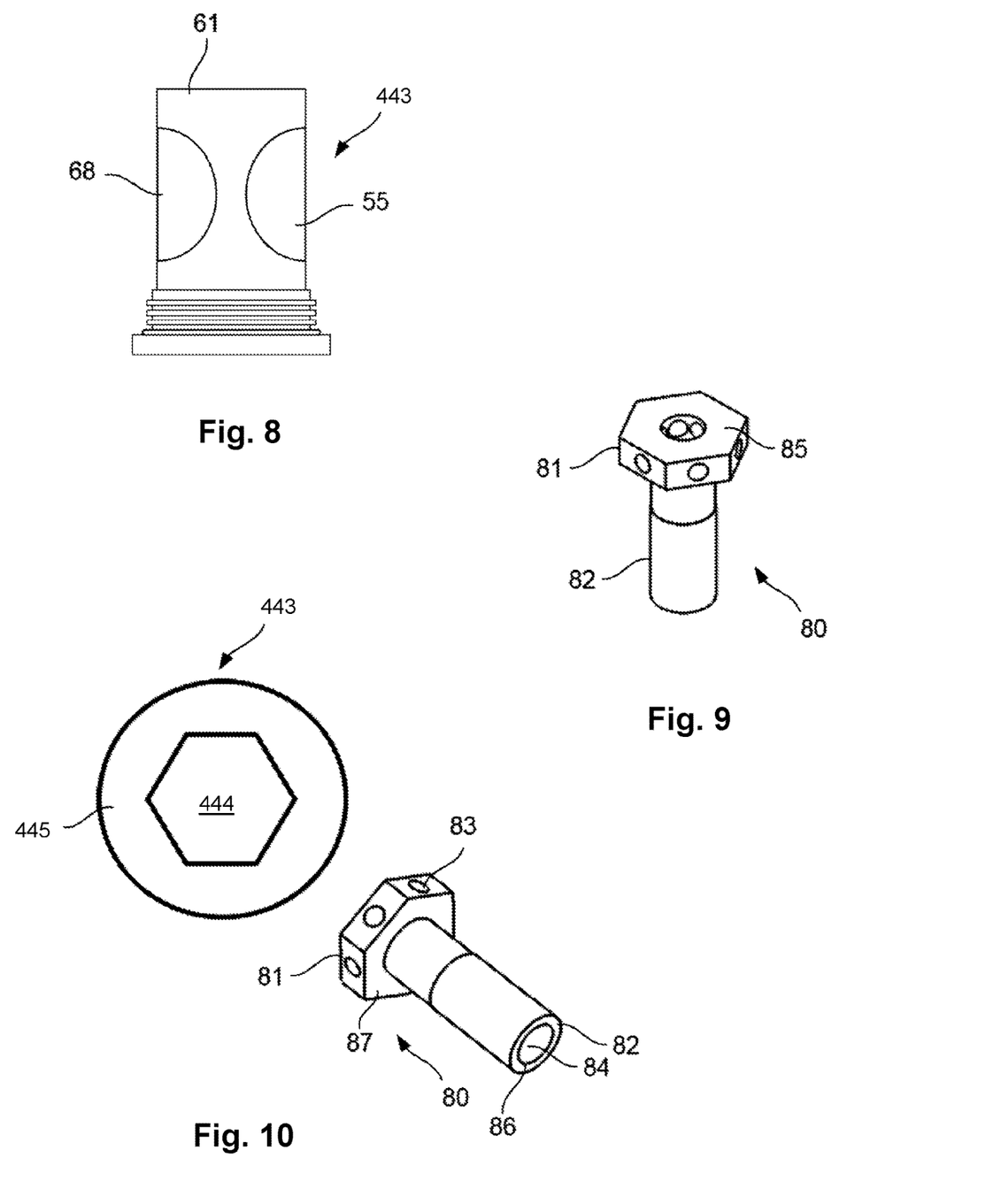
FIG. 8 is a schematic view of an alternative embodiment of part of the water drain valve.
FIG. 9 is a schematic perspective view of the drain tool shown in FIG. 5.
FIG. 10 is a schematic view of a lower side of the part of the water drain valve shown in FIG. 5 with the drain tool of FIG. 9 shown orientated for insertion into, but spaced from, the lower side.

For example, in FIG. 8 the filter 500 is integrally formed with the valve enclosure 61 of the valve arrangement 60. The water-permeable member 55 acts as a barrier to close the openings 68. As such, the filter space 54 is defined within the valve enclosure 61.

The water-permeable member 55 is formed from a water-permeable filter material. The filter material forms a permeation layer.

The water-permeable member 55 further comprises a support structure 56. The permeation layer is carried by the support structure 56 and may be bonded thereto. The permeation layer of the water-permeable member 55 may be disposed on an outer side of the support structure 56, as shown in FIG. 5, or may be arranged on an inner side. Alternatively, the permeation layer may be sandwiched between a pair of support structures 56 (not shown). The support structure 56 comprises a support layer. The support layer is formed from a porous substrate. The porous substrate forming the support layer may be formed, for example by a nylon, metallic or plastic material. Fluid is able to pass through the pours through the porous substrate.

The water-permeable material of the water-permeable member 55 enables water to flow through it, but substantially prevents liquid fuel, ice or particulate material from doing so. In the present embodiment, the permeation material comprises graphene oxide, although other suitable materials may be used. Graphene oxide is typically a layered structure of two-dimensional graphene nano-platelets, functionalised to control the physical properties of the oxide bonding between layers, but may be formed as an array of graphene oxide nanotubes, or graphene oxide enhanced hollow fibre (e.g. for vacuum pump applications). The graphene oxide is functionalised (that is, its structure is tailored, e.g. to customize the size of the nano-capillaries between the graphene platelets) to enable water molecules to pass through the water-permeable member 55 whilst blocking any molecules or particles larger than water molecules (including fuel molecules, ice and particulate material). Alternative suitable materials which enable water to flow through the material whilst substantially preventing liquid fuel, ice or particulate material from doing so may be used. In the present embodiments, the water permeable member 55 comprises the support structure 56 being formed from nylon with a graphene oxide coating acting as the water-permeable filter material. The passage of water through the water permeable member 55 is a reverse osmosis process, which is driven by the pressure differential created by the hydrostatic head of liquid within the fuel tank.

Referring now to FIG. 9 and FIG. 10, the example drain tool 80 is shown in more detail. The drain tool 80 is configured to act on the valve arrangement 60 to move the valve arrangement 60 between its closed flow condition and its open flow condition.

The drain cartridge 443 has the outflow 444 in its base 445. When the drain cartridge 443 is mounted in the fuel tank 30 the outflow 444 is exposed outside the fuel tank 30. Therefore, the outflow 444 is accessible to an operator.

As shown in FIG. 10, the outflow 444 has a hexagonal profile in the present embodiment. That is, a hexagonal shaped wall is formed in the base 445 to define the outflow 444. The profile shape of the outflow 44 may differ. In embodiments, the profile of the outflow 444 is non-circular. This ensures that the outflow has a section of major radial dimension and a section of minor radial dimension. In the present embodiments, the outflow 444 is uniform in an axial direction, but may converge towards an inner side to aid location of the drain tool 80, as will be apparent. The aperture 70 is defined on the inner side of the outflow 444.

The drain tool 80 comprises a tool head 81 and a tool shaft 82. The profile of the tool head 81 corresponds to the profile of the outflow 444. In particular, the profile shape and size of the tool head 81 corresponds to the shape and size of the aperture 70 defining the inner side of the outflow 444. As will become apparent, the configuration of the tool head 81 may differ from that of the outflow 444, but is arranged to act as a key to lock the valve arrangement 60 in its open flow condition.

In the present embodiment, the tool head 81 has a hexagonal profile. The tool head 81 is insertable into the outflow 444. The tool head 81 is configured to slide along the outflow 444 to abut against the valve head 63 at the inner side of the outflow 444.

The tool shaft 82 acts as a handle for the drain tool 80. The tool shaft 82 is elongate and extends from the tool head 81. The tool head 81 has an abutment surface 85.

Inlets 83 are formed in side faces of the tool head 81. The number of inlets 83 may differ. The inlets 83 communicate with a drain passage 86 formed in the drain tool 80. The drain passage 86 communicates the inlets 83 with an outlet 84 at a distal end of the tool shaft 82. The drain passage 86 provides a flow path for fluid received in the inlets 83 to the outlet 84. As such, fluid is able to flow through the drain tool 80 and out a distal end of the drain tool 80 from that received in the valve arrangement 60.

In use, the drain cartridge 443 is mounted to the fuel tank 30 as shown in FIG. 3. The drain cartridge 443 is inserted through a cartridge receiving aperture 49 and extends into the fuel tank 30.

In the particular illustrated example, the support structure 56 of the drain cartridge 443 is external to the water permeable member 55 and acts as a protective member to protect the water permeable member 55 from damage when the drain cartridge 443 is not mounted to the fuel tank 30, or is being mounted to or removed from the fuel tank 30 as shown in FIG. 4. In other examples, the support structure 56 may be internal to the water permeable member 55, e.g. to enhance the structural integrity of the water permeable member 55, or both an internal and an external support structure may be provided. When the drain cartridge 443 is mounted to the fuel tank 30 the drain cartridge 443 is received in the housing 441. The drain cartridge 443 and the housing 441 together form the water drain valve 400.

When a fuel/water mix is disposed in the fuel tank 30 this liquid is able to flow through the inflow 442 to be received in the water drain valve 400. As water 34 is denser than liquid hydrocarbon, then the water 34 typically forms a stratified layer at the lower end of the fuel tank 30. The water drain valve 400 is disposed at, or connected by piping to the lower end of the fuel tank (sump) 30 and so water will flow into the water drain valve 400 through the inflow 442, when the valve is operated.

Water and/or fuel is therefore disposed in the unfiltered space around the drain cartridge 443. The water and/or fuel therefore comes into contact with the exposed outer side 52 of the filter 500. Due to the arrangement of the filter 500 as described above, liquid water is able to pass through the filter 500 into the filtered space 54, but liquid fuel, for example liquid hydrocarbon, is prevented from doing so.

FIG. 5 shows the valve arrangement 60 in its closed flow condition with the drain tool 80 retracted from the water drain valve 40. That is, fluid flow through the valve arrangement 60 is prevented. As such, water is able to pass into the filtered space 54, but is prevented from flowing through the valve arrangement 60 and out of the outflow 444.

During normal operation, when the valve arrangement 60 is in its closed flow condition, no liquid is able to drain from the fuel tank 30. This ensures that no fluid flows from the fuel tank 30 through the water drain valve 400 during normal operation of the aircraft.

By preventing fluid leakage during normal operation of the aircraft through the water drain valve 400, it is possible to determine if there are any undesired leakages from the fuel tank. It also prevents liquid water from flowing out of the aircraft structure and along the aircraft structure during normal operation.

To drain liquid water from the fuel tank 30, an operator inserts the drain tool 80 into the outflow 444. The drain tool is orientated into alignment with the outflow 444 and the profile of the outflow 444 ensures the correct alignment of the drain tool 80 upon insertion. The tool head 81 of the drain tool 80 is moved into abutment with the valve arrangement 60. That is, the drain tool 80 acts against the valve head 63, against the biasing arrangement 66. The valve arrangement 60 which is biased into the closed flow condition is moved into the open flow condition by the action of the drain tool 80 being urged against the valve head 63.

The drain tool 80 is further inserted into the outflow 444 until the valve head 63 has moved through the outflow 444. FIG. 6 shows the drain tool 80 inserted through the outflow 444 in its first orientation. That is, the tool head 81 is aligned with the outflow 444. The valve arrangement 60 is in its open flow condition, but is not locked in this condition as the tool head 81 is free to slide along the outflow 444. That is, a lower side 87 of the tool head 81 moves past the aperture 70 at the inner side of the outflow 444 as shown in FIG. 6. In this position, the drain tool 80 is moveable into a second orientation. That is, the drain tool 80 is rotatable about its longitudinal axis to rotate the tool head 81. Upon rotation of the drain tool 80 into the second orientation the tool head 81 becomes misaligned with the outflow 444. With such a misalignment, the drain tool 80 cannot slide along the outflow 444.

The drain tool 80 therefore acts as a key, such that when the drain tool 80 is inserted through the outflow 444 and rotated into its second orientation, the valve arrangement 60 is locked in its open flow condition. That is, the valve arrangement 60 is unable to move into its closed flow condition due to the action of the drain tool 80. The lower side of the tool head 81 of the drain tool 80 abuts against the valve seat 64 such that the tool head 81 is disposed between the valve head 63 and the valve seat 64.

In FIG. 7, the drain tool 80 is inserted into the outflow 44 and extends through the outflow 44 so that the tool head is disposed between the valve head 60 and the valve seat 64. The drain tool 80 is orientated in its second orientation, and so is in misalignment with the outflow 444. As such, the valve arrangement is locked in its open flow condition. That is, the valve arrangement 60 is prevented from being biased into its closed flow condition by the drain tool 80.

When the valve arrangement 60 is in its open flow condition, liquid water is allowed to drain through the valve arrangement 60 to flow out of the outflow 444. Liquid water which has passed through the filter 500 into the filtered space 54 is able to flow along the outflow. Water which comes into contact with the water permeable member 55 of the filter 500 is able to pass through the water permeable member 55 from the exposed outer side 52 to the inner side 53, whereas fuel is prevented from doing so. The head of fluid in the fuel tank generates a pressure at the exposed outer side 52 to urge liquid water to flow through the filter 500 into the filtered space 54. This water is able then to flow through the outflow 444.

Water flowing out of the water drain valve 400 passes between the edge of the outflow 444 and the edges on the tool head 81, and passes through the drain passage 86 formed in the drain tool 80. As such, the drain tool 80 does not create a restriction through the outflow 444 due to its positioning in the outflow and its partial obstruction through the aperture 70 at the inner side of the outflow 444.

When an operator moves the valve arrangement 60 into its open flow condition through use of the drain tool 80, water is able to flow through the water drain valve 400 out of the fuel tank 30, whilst fuel in the fuel tank 30 is prevented from doing so. As such, there is no contamination of the drain water with fuel. The operator is able to lock the valve arrangement 60 in the open flow condition using the drain tool 80, and is able to leave the water drain valve 400 unattended whilst the water drains from the fuel tank 30 through the water drain valve 400. With this arrangement, it is unnecessary for the operator to remain in attendance of the water drain valve 400 during draining of water from the fuel tank 30. No fuel will drain through the water drain valve 400 due to the presence of the filter 500, and the water drain valve 400 can be left unattended to ensure that the maximum volume of water in the fuel tank 30 is drained from the fuel tank. The filter 500 will automatically stop any liquid hydrocarbon from passing through the water drain valve 400.

Once the liquid water has been drained from the fuel tank 30 through the water drain valve 40, the operator is able to move the drain tool 80 into its first orientation from its second orientation so that it is aligned with the outflow, and therefore remove the drain tool 80 from the outflow. As such, the valve arrangement 60 is than able to move into its closed flow condition from its open flow condition.

In the closed flow condition the valve arrangement 60 ensures that liquid in the filter space 54 does not come into contact with the external atmosphere. Filtering of liquid water into the filter space 54 may continue whilst the valve arrangement 60 is in its closed flow condition.

It will be understood that the drain tool 80 will only be used during maintenance of the aircraft 10. As such, the water drain valve 400 is in its closed flow condition during normal operation of the aircraft. Furthermore, an operator is able to easily identify any water drain valves 400 that have been left in the open condition without close inspection following a maintenance procedure.

It will be understood that the drain cartridge 443 can be easily installed and removed from the fuel tank 30 and is therefore interchangeable with another drain cartridge 43. As such, both of the valve arrangement 60 and the filter 500 are easily replaceable. Such an arrangement allows a water drain valve 400 of the present embodiments to be retro fitted to existing aircraft.

The above embodiments also prevent the filter 500 from damage due to external element due to the valve arrangement 60 being disposed between the outflow 444 and the filter 500 such that the filter 500 is not accessible when mounted to the fuel tank 30.

Figure 11A:
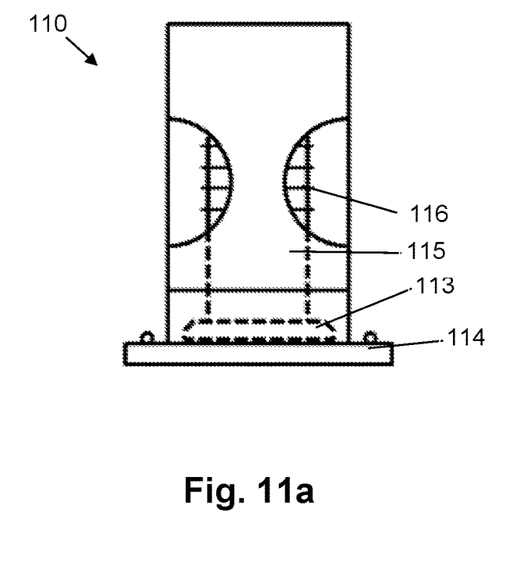
FIG. 11a is a schematic view of an example water drain valve for the fuel tank assembly of FIG. 1a in a closed flow condition.
Figure 11B:
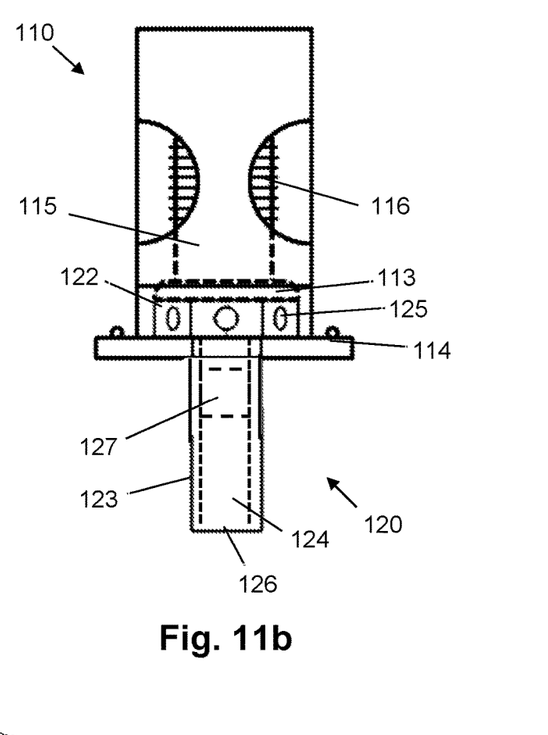
FIG. 11b is a schematic view of the water drain valve of FIG. 11a in an open flow condition, connected to an example drain tool.
Figure 12A:
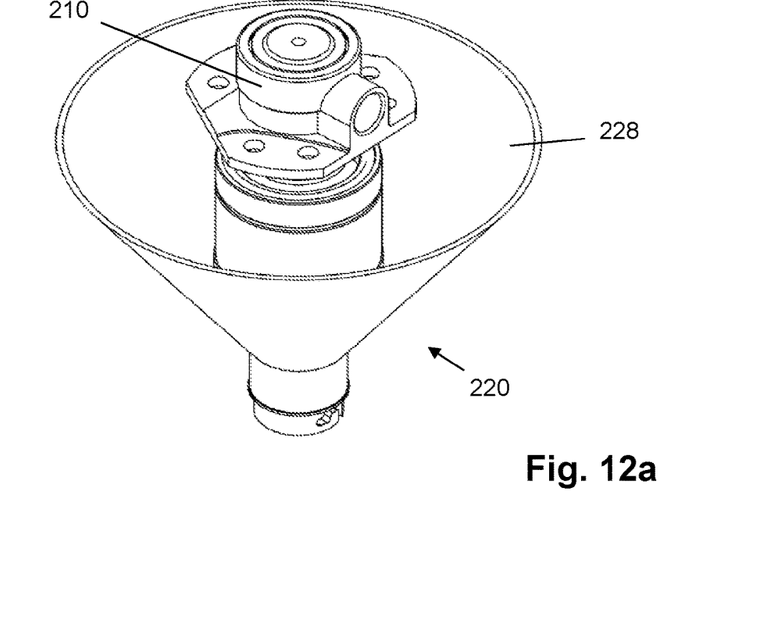
FIG. 12a is a perspective view of an example drain tool connected to an example water drain valve.
Figures 12B, 12C:
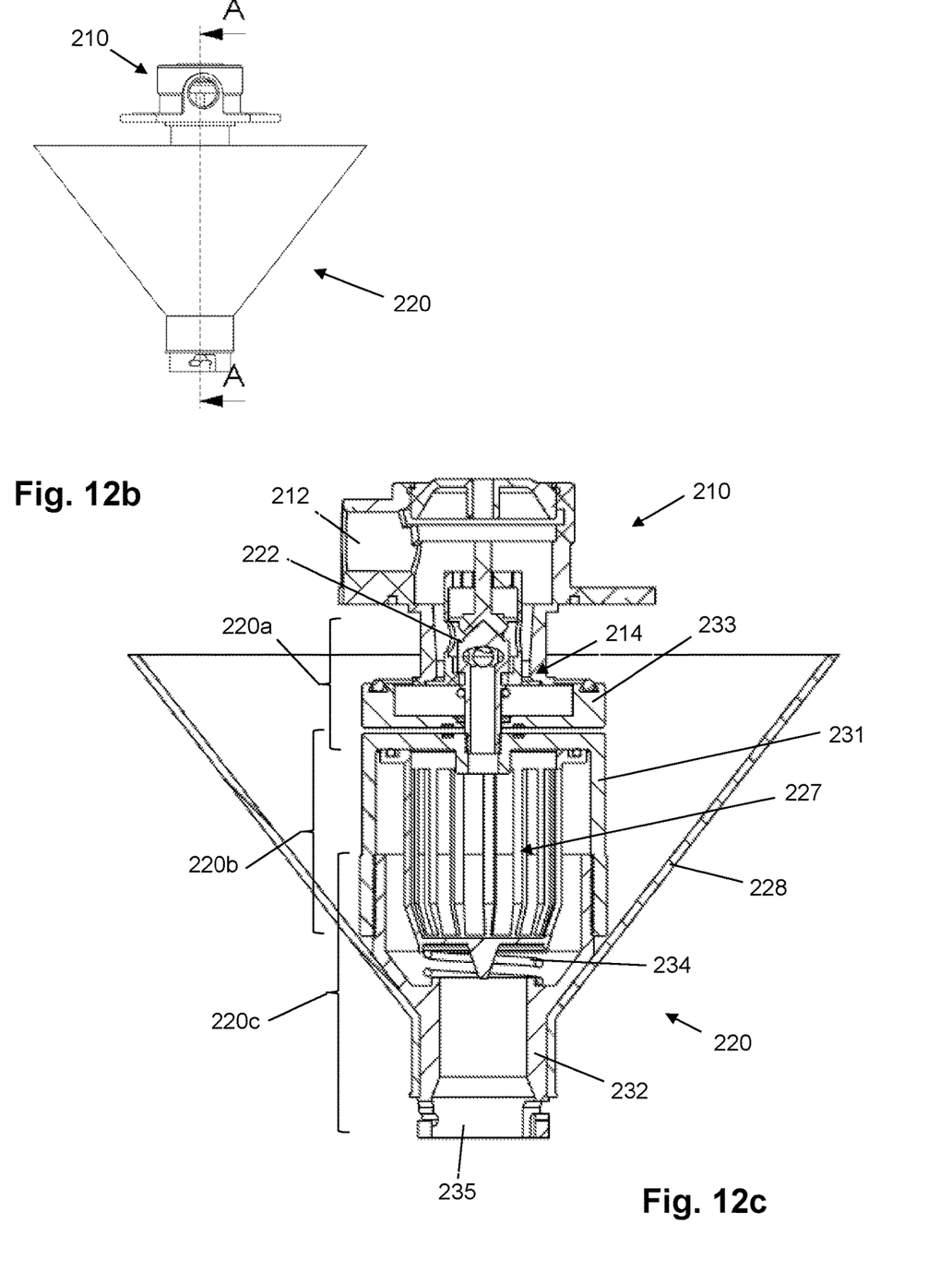

FIGS. 11a-12 illustrate an alternative combination of a fuel tank assembly and a drain tool, in which a filter for enabling the passage of liquid water whilst blocking the passage of liquid hydrocarbon is comprised in the drain tool. It may be desirable to provide the filter in the drain tool rather than in the fuel tank assembly for various reasons. For example, it may be easier to replace or maintain a filter comprised in a drain tool as compared to a filter comprised in a fuel tank assembly. Additionally, a drain tool may not be subject to the same size and configuration constraints as a fuel tank valve, permitting greater freedom when selecting the size and configuration of the filter. A larger filter may advantageously enable a greater flow rate of water through the filter. Moreover, for aircraft applications, a filter comprised in the fuel tank assembly would need to be certified, which would not be the case for a filter comprised in a drain tool.

FIG. 11a shows a schematic view of a particular example drain valve sealing mechanism 110, suitable for use with the water drain valve 40 of FIG. 2a, with the rest of the drain valve and the tank assembly omitted. The drain valve mechanism 110 is shown in a closed flow condition in FIG. 11a, and in an open flow condition in FIG. 11b. The example drain valve mechanism 110 may have any or all of the same features as the drain valve sealing mechanism of the drain valve 40 described above in relation to FIG. 2a. The example drain valve mechanism 110 may be for an aircraft fuel tank water/sump drain valve of any suitable known design.

In the particular illustrated example, the drain valve mechanism 110 comprises a valve seat 114 defined around an outflow of the valve mechanism 110; a valve head 113; a valve stem 115; and a biasing arrangement 116. These components may have the same or similar features as the corresponding components 64, 62, 63, 65 and 66 of the example valve 400 of FIGS. 5-7.

The drain valve mechanism 110 is openable by an operator using a drain tool, and FIG. 11b shows a drain tool 120 connected to the drain valve mechanism 110 to maintain it in the open flow condition. The drain tool 120 comprises a valve engaging head 122 configured to engage with a valve arrangement (e.g. a valve arrangement comprising the drain valve mechanism 110) to move the valve arrangement between the open and closed flow conditions, and a shaft 123 extending from the head. The head 122 has a plurality of inlets 125 for receiving a flow of liquid flowing out of the valve arrangement. The drain tool 120 further comprises a conduit 124 defining a liquid flow path through the tool between the inlets 125 and an outlet 126 provided at an end of the shaft 123 distal from the head 122. The head 122, shaft 123, conduit 124, inlets 125 and outlet 126 may be the same or similar to the corresponding parts 22, 23, 24, 25 and 26 of the drain tool 21 described above in relation to FIG. 2b.

The drain tool 120 additionally comprises a filter 127. The filter 127 comprises a water-permeable member which is configured to enable liquid water to pass through the water-permeable member, but at least substantially prevent liquid hydrocarbon from doing so. The filter 127 may have the same or similar material and filtration properties to the filter 500 described above. However; the size and/or configuration of the filter 127 may differ from that of the filter 500, by virtue of the filter 127 being configured to be comprised in a drain tool rather than in a fuel tank assembly. The filter 127 is disposed in the liquid flow path between the inlets 125 and the outlet 126. In the illustrated example the filter 127 is disposed in the conduit 124, toward the head 122 of the drain tool 120. However; in principle the filter 127 may be provided anywhere along the liquid flow path. The filter 127 may be integral with the drain tool 120, or alternatively may be comprised in a removable cartridge.

In some examples the drain tool 120 may additionally comprise a sealing member disposed on a body part of the tool. Such a sealing member may be configured to contact an outer surface of the fuel tank assembly when the tool is engaged with the valve arrangement, to create an enclosed space bounded by an outer surface of the fuel tank assembly, a surface of the tool, and the sealing member. The sealing member may thereby collect any liquid which flows out of the valve arrangement but not into the tool inlet 124, e.g. during a process of opening the valve arrangement. For example, a tool having a head configured like the example tool 80 described above allows liquid to pass between the edge of the outflow and the edges on the tool head 81 when the valve arrangement is locked open by the tool. Such liquid does not pass through the conduit in the tool, and may instead flow down the outer surface of the tool shaft (if not collected by a sealing member). The sealing member may be flexible, or otherwise deformable or moveable, to enable the sealing member to maintain contact with the outer surface of the fuel tank during a process of moving the valve arrangement between the closed flow condition and the open flow condition using the tool. The sealing member may comprise a polymer (e.g. rubber) cup.

FIGS. 12a-c show a particular example drain tool 220, which comprises a filter 227 and a sealing member 228. The drain tool 220 is shown connected to a valve assembly 210, which has a valve mechanism of the same general type as the valve mechanism 110 described above. FIG. 12c is a cross section through the drain tool 220 and valve assembly 210 along the line A-A marked on FIG. 12b. The valve assembly 210 has an inflow 212, which in use is disposed inside a fuel tank, and an outflow 214, which is connectable to the drain tool 220. The valve outflow opening has a particular shape, and a head part 222 of the drain tool is correspondingly shaped so that it may be inserted into the outflow 214.

The drain tool 220 comprises three main parts, which are separable and interchangeable. An upper part 220a (with reference to the in-use orientation shown in FIGS. 12a-c) is threadingly connected to a middle part 220b, which in this example is threadingly connected to a lower part 220c. Other suitable releasable mechanisms for connecting the parts could alternatively be provided. Forming the drain tool 220 from separable parts confers various advantages. In particular, a removable and interchangeable upper part 220a enables the tool to be used with a variety of different valve designs, since the upper part 220a can be easily swapped with an upper part 220a comprising a valve engaging head having a different configuration. Furthermore, the ability to separate the middle part 220b and lower part 220c enables access to an internal compartment in which a filter 227 is housed, thus enabling easy replacement, or servicing of the filter 227.

The upper part 220a comprises the head part 222. The head part 222 comprises a hollow shaft extending upwardly from the tool, which terminates in a valve engaging head configured to be inserted into the valve outflow 214 to engage with and apply an upwards force to a valve stem of the valve assembly 210. The valve engaging head has inlets to receive a flow of liquid into the hollow shaft, and thereby into the tool 220. The end of the shaft distal from the head is open, to allow liquid to flow out of the head part 222. The structure and function of the head part 22 is substantially similar to the structure and function of the example drain tool 80 of FIGS. 5-7. The head part 222 further comprises features facilitating locking the valve in the open flow condition, as will be described in more detail below with reference to FIGS. 13a-b. The end of the shaft distal from the valve engaging head has a screw thread (or other attachment means) for connecting the head part 222 to the middle part 220b of the tool.

In the illustrated example, the upper part 220a further comprises a primary sealing member 233. The primary sealing member 233 comprises a relatively rigid (compared with a secondary sealing member 228) cup having a relatively small (compared with the secondary sealing member 228) internal containment volume, and an upper edge configured to form an airtight seal against an outer surface of a fuel tank assembly to be drained. The upper edge of the primary sealing member 233 may, for example, comprise an O-ring seal. The primary sealing member is in the form of a ring, and the shaft of the head part 222 passes through the centre of the ring. The primary sealing member 233 is sealingly connected to the shaft of the head part 222, such that neither liquid nor air is able to pass between the primary sealing member 233 and the shaft. In some examples the primary sealing member 233 is moveably connected to the shaft, such that some axial movement of the shaft relative to the primary sealing member 233 is permitted. In such examples the primary sealing member 233 may be biased towards the head end of the shaft, into a position closer to the head end than a connected position of the primary sealing member 233. Alternatively an O-ring seal can be fixed into the primary sealing member 223, to create an air tight seal between the head part 222 and the primary sealing member 233. This may facilitate the creation and maintenance of an air tight seal between the primary sealing member 233 and the outer surface of the fuel tank assembly whilst the tool 220 is connected to the valve 210.

The primary sealing member 233 surrounds the valve outflow 214 when the tool 220 is connected to the valve assembly 210, so that an air tight space is created between the interior surface of the primary sealing member 233 and the outer surface of the fuel tank assembly. Creating an air tight space of relatively small volume around the outflow can advantageously improve flow rate through the filter 227. In operation of the tool, liquid flowing between the edges of the valve engaging head and the interior edge of the outflow is caught by and retained within the primary sealing member 233. During a process of draining liquid from a fuel tank assembly, the air tight space within the primary sealing member 233 will be filled with liquid for substantially the whole time that the tool 220 is connected to the valve 210. However; other examples are possible in which the primary sealing member 233 is not present.

The middle part 220b of the tool houses the filter 227. The middle part 220b comprises a housing 231. The shaft of the head part 222 is connected to an opening in the upper surface of the housing 231, when the tool is in an assembled state. Liquid may thereby flow from the head part 222 into the middle part 220b. The lower part of the housing 231 is open, to at least partly receive the lower part 220c of the tool. The lower part of the housing 231 is connected to the lower part 220c of the tool in any suitable manner, e.g. by a screw thread. The connection between the middle part 220b and the lower part 220c is preferably water tight.

In the illustrated example the filter 227 is comprised in a cartridge. The cartridge comprises a support structure configured to be received and retained in the tool (in this example, in the middle part 220b of the tool) and a filter mounted on the support structure. The filter comprises a water-permeable member which is configured to enable liquid water to pass through the water-permeable member, but at least substantially prevent liquid hydrocarbon from doing so. The support structure may have any of the features of the support structure 56 described above. The water-permeable member may have any of the features of the water-permeable member 55 described above. The cartridge may be configured to maximise the surface area of the water-permeable member. For example, the support structure may be configured to support a folded or corrugated arrangement of the water-permeable member.

The filter cartridge 227 is cup-shaped, and an open end of the filter 227 sealingly contacts an upper interior surface of the housing 231, around the opening through which liquid is received from the upper part 220a. A biasing mechanism 234 (e.g. a spring) presses the filter cartridge 227 against the housing to maintain a seal, which is preferably water tight and air tight. The filter 227 and the upper interior surface of the housing 231 thereby define an enclosed filtration space into which liquid flowing into the second part 220b is received. Liquid within the filtration space cannot flow any further through the tool 220 without passing through the filter 227.

The lower part 220c of the tool is configured to connect to the middle part 220b, as mentioned above. The lower part 220c comprises a housing 232, which defines a conduit joining a chamber in which the filter cartridge 227 is disposed, and an outlet 235 of the tool 220. The housing 232 supports the biasing mechanism 234, such that the filter cartridge 227 is supported and retained between the lower part housing 232 and the middle part housing 231. The housing 232 is open at both the upper end and the lower end. The lower end of the housing 232 forms the outlet 235 of the tool 220, from which liquid water flows out of the tool 220 during use. In the particular illustrated example, the outlet of the lower part housing 232 comprises a connector for connecting the tool to a further apparatus, such as a pipe, hose, collection bag/bottle, telescopic pole, etc. In the particular example the connector comprises a bayonet connector, but any other type of connector may alternatively be used.

The lower part 220c further comprises a secondary sealing member 228. The secondary sealing member 228 is sealingly fixed to the outer surface of the lower part housing 232 such that neither liquid nor air is able to pass between the secondary sealing member 228 and the housing 232. The secondary sealing member 228 comprises a relatively flexible (compared with the primary sealing member 233) cup having a relatively large (compared with the primary sealing member 233) internal containment volume, and an upper edge configured to form a seal against an outer surface of a fuel tank assembly to be drained. The seal formed by the upper edge of the secondary sealing member 228 may be less effective than the seal formed by the upper edge of the primary sealing member 233. For example, the seal formed by the upper edge of the secondary sealing member 228 may not be air tight.

The secondary sealing member 228 surrounds and contains the middle part 220b and the upper part 220a of the tool. Due to the flexibility of the secondary sealing member 228, it may deform during operation of the tool 220, e.g. to accommodate movement of the tool during a process of engaging the tool with the valve assembly, and to maintain a seal with the outer surface of the fuel tank during such an engagement process. In particular, in an undeformed state the secondary sealing member 228 extends upwardly by a sufficient amount that, as the tool 220 is brought into engagement with the valve assembly 210, the upper edge of the secondary sealing member 228 contacts the outer surface of the fuel tank before the valve stem begins to be moved upwards by the valve engaging head of the tool 220. This ensures that any liquid which flows out of the valve 210 before the primary sealing member 233 has sealed against the tank outer surface is caught by the secondary sealing member 228. As the tool continues to move upwardly to fully open the valve 210, the secondary sealing member 228 deforms to accommodate this movement. For example, a secondary sealing member having the conical shape illustrated in FIGS. 12a-c will experience outward bending of its side walls. Preferably the secondary sealing member 228 is sufficiently flexible that it can also accommodate some lateral (e.g. tilting) and/or rotational (e.g. twisting) movement of the tool during the valve engagement process whilst maintaining contact with the fuel tank outer surface. It will be appreciated that the secondary sealing member 228 is also able to maintain the seal during a process of disengaging the tool 220 from the valve assembly 210. Liquid contained in the primary sealing member 233 may spill out over the upper edge of the primary sealing member 233 when the tool is disengaged—this will be caught by the secondary sealing member 228. The secondary sealing member 228 therefore enables completely clean (that is, without any spillage of liquid) engagement and disengagement of the tool 220 with the valve assembly 210. However, other examples are possible in which the secondary sealing member 228 is not present.

Figure 13A:
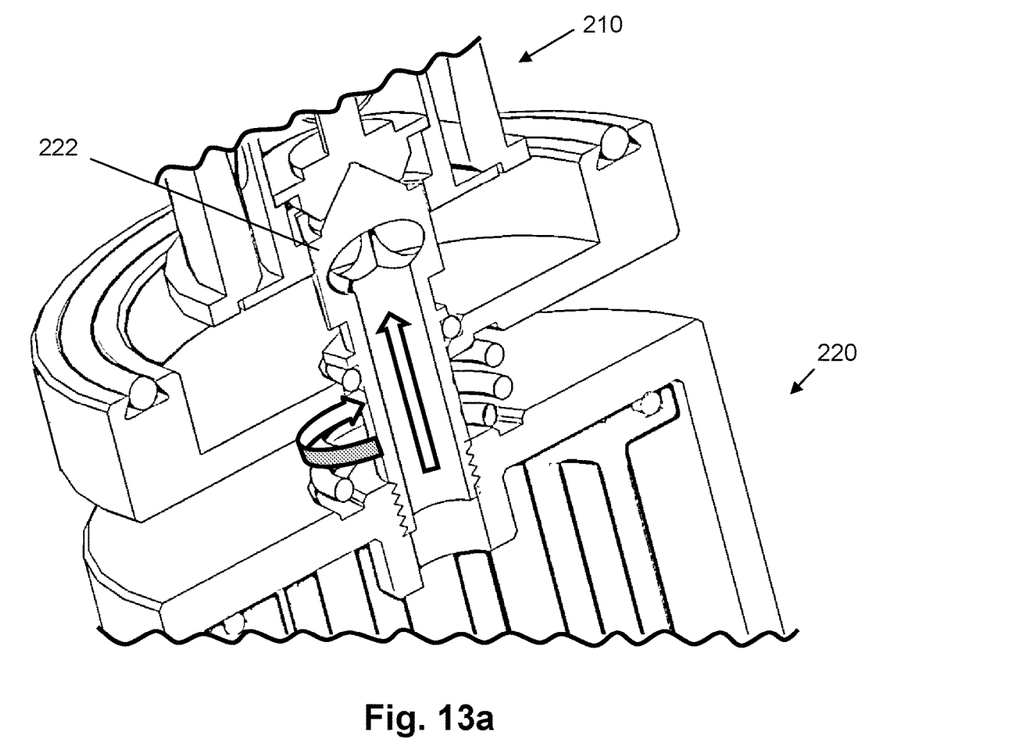
Figure 13B:
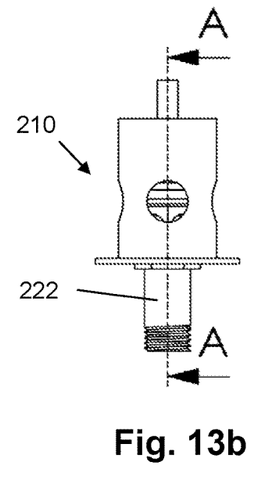
Figure 13C:
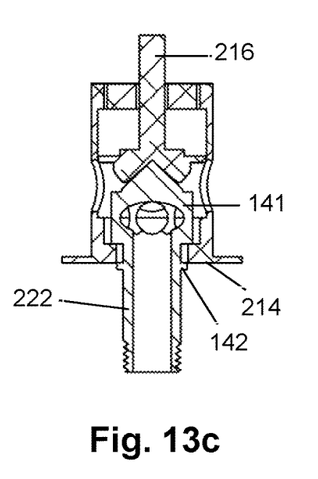
Figure 13D:
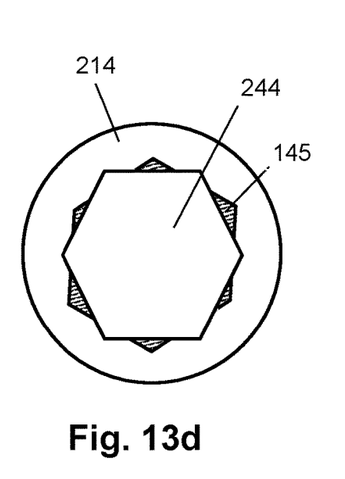

The features of the head part 222 which facilitate locking the valve 210 in the open flow condition will now be described with reference to FIGS. 13a-d. FIG. 13a is a partial cutaway view of the tool 220 during a process of engaging with the valve 210. FIG. 13b is a side view of the head part 222 of the tool engaged with an inner part of the valve 210 (the valve outer housing is omitted for clarity), and FIG. 14c is a cross section along the line A-A of FIG. 13b. FIG. 13d shows the valve arrangement 210 from below, looking up into the outflow.

In FIG. 13a the head part 222 of the tool has been inserted into the outflow of the valve 210 and has contacted the valve stem, but has not yet moved the valve stem from its closed position. To open the valve, the tool is pushed upwardly by an operator, as indicated by the straight block arrow. However; merely inserting the tool 220 in this manner does not lock it position, meaning that if the operator releases the upwards force on the tool 220 it will allow the valve 210 to revert to its closed flow condition (due to the biasing mechanism of the valve 210). The particular example tool 220 comprises features which enable the tool to lock the valve 210 in the open flow condition, so that the operator may leave the fuel tank to drain unattended.

In particular, the valve engaging head part 141 of the tool head part 222 has a hexagonal cross section, similar to the head of the example tool 80. The outflow opening 244 of the valve assembly 210 is also hexagonal. The tool head is sized so that it is a close fit with the outflow opening 244, meaning that relative rotation of the tool head and outflow is substantially prevented whilst the tool head is passing through the opening. However; once the hexagonal tool head has passed through the outflow opening 244 and into the interior space of the valve 210, it is free to rotate. Rotating the head part 222 relative to the valve opening (as indicated by the curved block arrow) causes the respective hexagons to misalign, preventing the tool head from passing back through the outflow opening 244. The tool is thereby retained in place, and supports the valve stem in an open position. This locking mechanism is substantially the same as that described above in relation to the example tool 80.

The example tool head part 222 comprises further features which facilitate and improve this locking process. In particular, the tool head part comprises a locking flange 142 in the form of a hexagonal plate which extends radially from the shaft of the head part 222, below the hexagonal valve-engaging head. The hexagon of the locking flange 142 is rotationally aligned with the hexagon of the valve-engaging head. The locking flange 142 is disposed at a selected axial position on the shaft such that the locking flange 142 contacts a lower surface of the valve base 214 when the valve stem 216 has reached or is just about to reach a fully open position. Moreover, an axial gap between the bottom surface of the valve-engaging head and the top surface of the locking flange 142 is at least as wide as the thickness of the valve base around the outflow opening 244, such that the valve-engaging head has passed fully through the outflow opening 244 before the locking flange 142 contacts the valve base 214.

As illustrated by FIG. 13d, the outflow opening of the valve 210 is configured to cooperate with the locking flange 142 to provide a tactile indication to the operator of when the hexagonal valve-engaging head is in an optimum locked position relative to the outflow opening (for a hexagonal tool head and opening, an offset of 30° is optimal). The lower surface of the valve base 214 comprises a plurality of triangular recesses 145 around the outflow opening 244. These recesses correspond to the vertices of a hexagon having the same size as the outflow opening but rotated by 30°. If the operator twists the tool 220 whilst urging it upwardly against the valve stem, the locking flange 142 will become received within these recesses when the valve is fully open and the tool is in the optimum rotational position for locking the valve open. The operator will feel the engagement of the locking flange 142 with the recesses 145 and know that they can then leave the tool in that rotational position to securely lock the valve in the open flow condition.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A combination comprising an aircraft fuel tank assembly and a maintenance drain tool configured to open an outlet of the aircraft fuel tank assembly during a maintenance procedure, wherein:
   the aircraft fuel tank assembly comprises an aircraft fuel tank configured to store a liquid hydrocarbon; and an operator-openable valve arrangement configured to move between a closed flow condition in which flow through the valve arrangement is prevented and an open flow condition in which liquid is allowed to drain out of the aircraft fuel tank to the exterior of the aircraft fuel tank;
   the maintenance drain tool is configured to be connected to the valve arrangement during the maintenance procedure, such that a connected condition of the maintenance drain tool causes the valve arrangement to be in the open flow condition and a liquid flow path to exist between an interior of the aircraft fuel tank and an exterior of the aircraft fuel tank, the liquid flow path being at least partly defined by a conduit comprised in the maintenance drain tool; and
   the combination further comprises a filter disposed in the liquid flow path, the filter comprising a water-permeable member which is configured to enable liquid water to pass through the water-permeable member to the exterior of the aircraft fuel tank, and at least substantially prevent passage of liquid hydrocarbon to the exterior of the aircraft fuel tank during the maintenance procedure.

2. The combination according to claim 1, wherein the valve arrangement is biased towards the closed flow condition.

3. The combination according to claim 2, wherein the valve arrangement is configured to receive the maintenance drain tool and interact with the maintenance drain tool to move into the open flow condition.

4. The combination according to claim 1, wherein the valve arrangement is configured to be lockable in the open flow condition.

5. The combination according to claim 4, wherein the valve arrangement is configured to receive the maintenance drain tool and interact with the maintenance drain tool to lock the valve arrangement in the open flow condition.

6. The combination according to claim 5, wherein the aircraft fuel tank comprises an outflow, and the outflow is configured to receive the maintenance drain tool to lock the valve arrangement in the open flow condition.

7. The combination according to claim 6, wherein the outflow is configured to allow insertion of the maintenance drain tool when the maintenance drain tool is in a first orientation, and to engage with the maintenance drain tool to restrict removal of the maintenance drain tool and lock the valve arrangement in the open flow condition when the maintenance drain tool is moved into a second orientation, and wherein the maintenance drain tool comprises a valve engaging head configured to conform with the outflow to allow insertion of the maintenance drain tool into the outflow when the maintenance drain tool is in the first orientation and to engage the valve arrangement to restrict removal of the maintenance drain tool and lock the valve arrangement in the open flow condition when the maintenance drain tool is in the second orientation.

8. The combination according to claim 7, wherein the valve engaging head is non-circular.

9. The combination according to claim 7, further comprising a tool shaft extending from the valve engaging head.

10. The combination according to claim 9, wherein the conduit extends from an outer face of the valve engaging head and in the tool shaft.

11. The combination according to claim 1, wherein the water-permeable member comprises graphene oxide.

12. The combination according to claim 11, wherein the water-permeable member comprises a graphene oxide membrane.

13. The combination according to claim 11, wherein the water permeable member comprises a graphene enhanced filter, and wherein the graphene enhanced filter comprises one or more of: a functionalised graphene oxide doped permeable membrane; functionalised graphene oxide nanotubes; and functionalised graphene oxide hollow fibres.

14. The combination according to claim 1, wherein the filter comprises a support structure to support the water-permeable member.

15. The combination according to claim 14, wherein the water-permeable member comprises a water-permeable material and the support structure comprises a support layer to support the water-permeable material.

16. The combination according to claim 15, wherein the support layer is a porous substrate.

17. The combination according to claim 1, wherein the valve arrangement is a poppet valve.

18. The combination according to claim 1, wherein the filter is comprised in the aircraft fuel tank assembly.

19. The combination according to claim 1, wherein the filter is comprised in the tool.

20. An aircraft fuel tank assembly comprising:
an aircraft fuel tank configured to store a liquid hydrocarbon,
a filter comprising a water-permeable member which is configured to enable liquid water in the aircraft fuel tank to pass through the water-permeable member, and at least substantially prevent passage of liquid hydrocarbon; and
an operator-openable valve arrangement configured to move between a closed flow condition in which flow through the valve arrangement is prevented, and an open flow condition configured for liquid water to pass from the tank, through the water-permeable member and drain out of the tank, wherein the operator-openable valve arrangement is configured to be moved to the open flow condition by attachment of a tool to an outlet of the operator-openable valve arrangement, and wherein the valve arrangement is between the filter and an outflow of the aircraft fuel tank.

21. The aircraft fuel tank assembly according to claim 20, wherein the filter comprising the water-permeable member is configured to enable liquid water in the aircraft fuel tank to pass through the water-permeable member to the valve arrangement, but at least substantially prevent liquid hydrocarbon from doing so.

22. The aircraft fuel tank assembly according to claim 20, wherein the filter acts as a barrier between liquid hydrocarbon in the aircraft fuel tank and the valve arrangement.

23. The aircraft fuel tank assembly according to claim 20, wherein the filter encloses the valve arrangement in the aircraft fuel tank.

24. The aircraft fuel tank assembly according to claim 20, wherein the valve arrangement comprises an enclosure having an opening, wherein the filter is on the enclosure to cover the opening.

25. The aircraft fuel tank assembly according to claim 20, wherein the valve arrangement and filter together form a cartridge.

26. The aircraft fuel tank assembly according to claim 25, wherein the cartridge is removable from the aircraft fuel tank.

27. The aircraft fuel tank assembly according to claim 26, further comprising a housing in the aircraft fuel tank, wherein the cartridge is configured to be at least partially received by and mounted to the housing.

28. The aircraft fuel tank assembly according to claim 20, wherein one or both of the filter and valve arrangement are integral with the aircraft fuel tank.

29. The aircraft fuel tank according to claim 20, wherein the water-permeable member comprises graphene oxide.

30. The aircraft fuel tank according to claim 20, wherein the water-permeable member comprises a graphene oxide membrane.

31. The aircraft fuel tank according to claim 20, wherein the water permeable member comprises a graphene enhanced filter, and wherein the graphene enhanced filter comprises one or more of: a functionalised graphene oxide doped permeable membrane; functionalised graphene oxide nanotubes; and functionalised graphene oxide hollow fibres.

32. An aircraft fuel tank assembly comprising:
an aircraft fuel tank configured to store a liquid hydrocarbon,
a filter comprising a water-permeable member which is configured to enable liquid water in the aircraft fuel tank to pass through the water-permeable member, and at least substantially prevent passage of liquid hydrocarbon; and
an operator-openable valve arrangement configured to move between a closed flow condition in which flow through the valve arrangement is prevented, and an open flow condition configured for liquid water to pass from the tank, through the water-permeable member and drain out of the tank, wherein the operator-openable valve arrangement is configured to be moved to the open flow condition by attachment of a tool to an outlet of the operator-openable valve arrangement, and wherein a liquid water receiving space is defined between the filter and the valve arrangement.

* * * * *